(12) United States Patent
Itoh et al.

(10) Patent No.: US 10,387,033 B2
(45) Date of Patent: Aug. 20, 2019

(54) SIZE REDUCTION AND UTILIZATION OF SOFTWARE KEYBOARDS

(71) Applicant: Lenovo (Singapore) Pte. Ltd., Singapore (SG)

(72) Inventors: Hiroshi Itoh, Kanagawa-ken (JP); Fusanobu Nakamura, Kanagawa-ken (JP); Mitsuhiro Yamazaki, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 162 days.

(21) Appl. No.: 14/299,617

(22) Filed: Jun. 9, 2014

(65) Prior Publication Data

US 2015/0007088 A1    Jan. 1, 2015

(30) Foreign Application Priority Data

Jun. 10, 2013  (JP) ................................ 2013-121730

(51) Int. Cl.
*G06F 3/0488*  (2013.01)
*G06F 1/16*  (2006.01)

(52) U.S. Cl.
CPC .......... *G06F 3/04886* (2013.01); *G06F 1/169* (2013.01); *G06F 1/1643* (2013.01)

(58) Field of Classification Search
CPC .. G06F 3/04886; G06F 3/0481; G06F 1/1643; G06F 1/169; G06F 3/0221; G06F 1/1666
See application file for complete search history.

(56) References Cited

U.S. PATENT DOCUMENTS

| | | | | |
|---|---|---|---|---|
| 5,936,614 A | * | 8/1999 | An ...................... | G06F 3/04886 345/173 |
| 9,013,397 B2 | * | 4/2015 | Hiramoto .............. | G06F 1/1613 345/156 |
| 2007/0083817 A1 | * | 4/2007 | Schmidt ................ | G06F 1/1626 715/762 |
| 2009/0213081 A1 | * | 8/2009 | Case, Jr. ............... | G06F 1/1616 345/173 |
| 2011/0090151 A1 | * | 4/2011 | Huang .................. | G06F 3/0237 345/168 |
| 2013/0093680 A1 | * | 4/2013 | Ogita .................... | G06F 1/1626 345/168 |

FOREIGN PATENT DOCUMENTS

| | | | |
|---|---|---|---|
| JP | 2005174023 A | 6/2005 | |
| JP | 2006216087 A | 8/2006 | |

(Continued)

*Primary Examiner* — Shen Shiau
(74) *Attorney, Agent, or Firm* — Ference & Associates LLC

(57) ABSTRACT

An embodiment provides a method, including: displaying, on a touch sensitive display, a data structure composed of a plurality of keys in a keyboard window; determining, using a processor, at least one key to display in the keyboard window; receiving, at an input device, user input; changing, based on user input, the keys to be displayed in the keyboard window; and selecting a key based on user input, using the touch sensitive display screen, from the keys displayed in the keyboard window. Other embodiments are described and claimed.

13 Claims, 7 Drawing Sheets

(56) References Cited

FOREIGN PATENT DOCUMENTS

| | | | |
|---|---|---|---|
| JP | 2008112471 | A | 5/2008 |
| JP | 2010140321 | A | 6/2010 |
| JP | 2010146032 | A | 7/2010 |
| JP | 2012208614 | A | 10/2012 |
| JP | 2012242851 | A | 10/2012 |
| JP | 2013235344 | A | 11/2013 |
| JP | 2014092880 | A | 5/2014 |
| WO | 2007119136 | A1 | 10/2007 |
| WO | 201275197 | A2 | 6/2012 |
| WO | 2012132291 | A1 | 10/2012 |

\* cited by examiner

SIZE REDUCTION AND UTILIZATION OF SOFTWARE KEYBOARDS

CLAIM FOR PRIORITY

This application claims priority from Japanese Application No. 2013-121730, filed on Jun. 10, 2013, and which is fully incorporated by reference as if fully set forth herein.

BACKGROUND

A portable electronic device such as a smartphone or a tablet terminal allows a user to enter a character or a number with a touch of a finger on a software keyboard displayed on a touch screen. The software keyboard has operational restrictions because the display area of the touch screen is small compared with that of a hardware keyboard made up of physical keys used in a laptop personal computer or with a desktop personal computer.

Commonly, when a software keyboard is displayed on a small touch screen like that of a smartphone, many keys are displayed concurrently, e.g., like the QWERTY keyboard layout, thus an application screen such as a mailer screen or a browser screen are hidden, and hence restricted in operating and browsing the application screen while performing input. Further, when the size of each key is reduced to enlarge the display area of the application screen, the user may select an adjacent key with a finger, resulting in wasting time until a target key is confirmed.

Although the number of keys displayed can be reduced to enlarge each key like in a flick operation, this requires multiple operations until the target key is confirmed. Further, in the case where a user wants to operate a smartphone while holding it in one hand when, for example, the user is holding onto a strap in a train or carrying baggage in the other hand. A user cannot perform an input operation easily on conventional smartphones at this time of unstable holding because of possible unintended touch operations on the application screen displayed on the touch screen.

BRIEF SUMMARY

In summary, one aspect provides a method, comprising: displaying, on a touch sensitive display, a data structure composed of a plurality of keys in a keyboard window; determining, using a processor, at least one key to display in the keyboard window; receiving, at an input device, user input; changing, based on user input, the keys to be displayed in the keyboard window; and selecting a key based on user input, using the touch sensitive display screen, from the keys displayed in the keyboard window.

Another aspect provides an apparatus, comprising: a housing; a touch sensitive display on the surface of the housing; an input device; a processor operatively coupled to the input device and the display; and a memory storing instructions that are executable by the processor to: display a data structure composed of a plurality of keys in a keyboard window; determine at least one key to display in the keyboard window; receive user input; change the keys to be displayed in the keyboard window according to input received at the input device; and select a key from the keys displayed in the keyboard window using user input from the touch sensitive display screen.

A further aspect provides a product, comprising: a computer readable storage device storing code therewith, the code being executable by a processor and comprising: code that displays a data structure composed of a plurality of keys in a keyboard window; code that determines at least one key to display in the keyboard window; code that receive user input; code that changes, based on user input, the keys to be displayed in the keyboard window; and code that selects a key based on user input from the keys displayed in the keyboard window.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figures 1A, 1B:
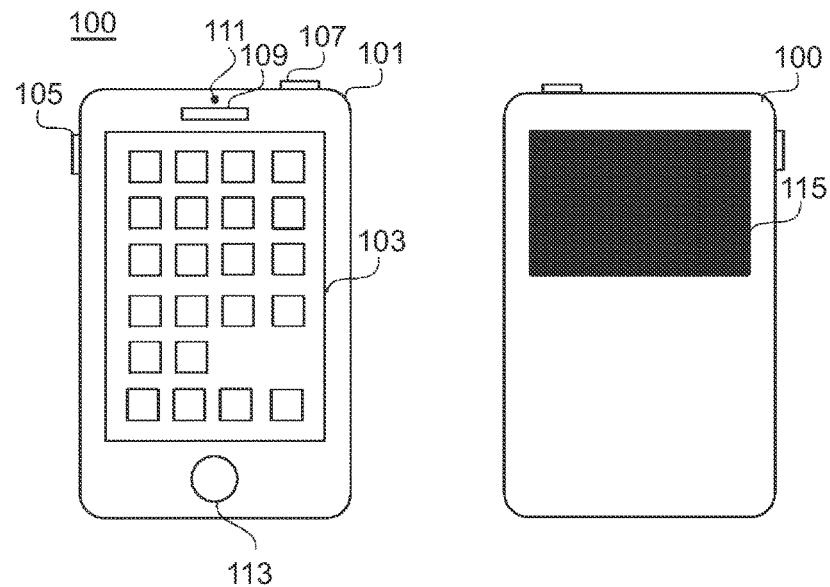
FIG. 1(A-B) is a diagram showing an external form of a smartphone as an example of a portable electronic device.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The remainder of the disclosure begins with a general overview and proceeds to give a more detailed description of example embodiments with reference to the accompanying figures.

In view of the above described conventional arrangements, an embodiment provides an input system having a software keyboard with a small display area on a display. Another embodiment provides an input system enabling one-handed operation. An additional embodiment provides an input system convenient for operating and browsing an application screen. A further additional embodiment provides an input system with less erroneous selection of a key. An even further additional embodiment provides a smartphone, an input method, and a computer program to which such an input system is applied.

An input system according an embodiment includes a display on the surface of a housing. Further, the input system has virtual keys composed of multiple keys and the whole of which is not displayed at a time, a keyboard window for displaying some of the virtual keys on the display, a touch panel for performing an input operation on the virtual keys, and a keyboard processing section for changing keys to be displayed in the keyboard window according to the input operation to the touch panel and confirming the input. The keyboard window has only to be an area on the display for displaying some of the virtual keys. Therefore, the frame of the keyboard window may be or may not be displayed, or may be displayed translucently.

Because only some of the multiple keys are displayed on the display, the area of displaying an application screen is enlarged to make it easy to operate and browse the screen of an application executed concurrently with an input operation. Because the whole of the virtual keys is not displayed on the display at a time, the key layout and the number of keys can be selected freely. The display may be configured to form a touch screen in combination with the touch panel. When the touch panel is provided on the rear face of the housing, the size of a key to be displayed is not restricted by the size of a finger used in operating the touch screen, so that the key can be displayed by reducing the size to such an extent that causes no visibility problem.

When a touch operation is performed on the touch screen, if the key to be displayed is small, an adjacent key may be touched by mistake and hence a redo may be required. In addition, since a wrong selection is not known until an actual touch operation is performed; it may take time to perform input. In the input system of an embodiment, an operation from the rear touch panel provides the display of a target key in the keyboard window even if the key to be displayed is made small, enabling accurate selection of the key.

The operation from the rear touch panel also eliminates unnecessary touch operations with respect to the application screen displayed on the touch screen. Further, the rear touch panel can be operated with a forefinger of a hand in which the portable electronic device is held, enabling one-handed operation. A key to be displayed in the keyboard window can be changed by a swipe operation with respect to the rear touch panel. Since the swipe operation can move a distantly-positioned key in a short time, the input time can be shortened. Note that an operation using a volume control button may be performed instead of the swipe operation of the touch panel.

In order to change a key to be displayed in the keyboard window, the virtual keys may be moved while displaying the keyboard window in a predetermined, fixed position of the display, or the keyboard window may be moved while positioning each key of the virtual keys at predetermined coordinates of the display. The keyboard window may display only one selection key, or may include a selection area for displaying one selection key and auxiliary areas for displaying keys adjacent to the selection key.

The keyboard processing section changes the speed of moving the virtual keys across the keyboard window according to the speed of a swipe. When the moving speed of the virtual keys becomes less than or equal to a predetermined value or when the movement is stopped, if the selection area contains two or more keys, the keyboard processing section can forcibly position a key that occupies the largest area in the selection area. In this case, because there is no need to make a fine adjustment of the display position of the selection key by a swipe operation, the time required until the key is positioned in the selection area can be shortened.

When operating from the rear touch panel, the keyboard processing section can process all operations performed on a front touch panel as operations to the application screen. Therefore, keys to be displayed in the keyboard window or all the virtual keys can be displayed translucently. The translucent display enables input operation while preventing the application screen from being hidden behind the keys, and enables the virtual keys to be displayed concurrently.

The virtual keys may be of a data structure in two-dimensional arrangement so that the keyboard window will display multiple keys arranged two-dimensionally. The two-dimensionally arranged virtual keys can be configured in a QWERTY layout. The keyboard window can also display nine keys in a 3×3 matrix to set a key displayed at the center as the selection key. Further, the virtual keys may be of a data structure in a one-dimensional array so that the keyboard window will display one or plural keys arranged one-dimensionally.

According to an embodiment, there can be provided an input system having a software keyboard with a small display area on a display. According to another embodiment, there can also be provided an input system enabling one-handed operation. According to a further embodiment, there can further be provided an input system convenient for operating and browsing an application screen. Further, according to an additional embodiment, there can be provided an input system with less erroneous selection of a key. Furthermore, according to an additional embodiment, there can be provided a smartphone, an input method, and a computer program to which such an input system is applied.

Among pieces of electronic equipment such as smartphones and tablet terminals, there is proposed a user interface for symbol input. The interface is provided with an elongated touch sensing type sensor area in a position adjacent to a display, and a character list including multiple characters is displayed on the display. A user operates a predetermined position of the touch sensing type sensor with a finger to select a character in the character list displayed in a corresponding position. (For example, see Japanese translation of PCT Application No. 2009-534731).

Further, among pieces of electronic equipment such as smartphones and tablet terminals, there is proposed a GUI for password input. An example of which involves a character set composed of alphabets and numbers to be displayed while rotating in a slot machine-like character rotating display section. When a character that forms part of a password comes to a point portion, a user clicks a pointing device to select the character. In another example, a string of characters available for a password are arranged linearly, and a pointer automatically moves across these characters. When the pointer points to a character that forms part of a password, a user clicks a pointing device to select the character. For example, see Japanese Patent Application Publication No. 2005-174023.

Even further, among pieces of electronic equipment such as smartphones and tablet terminals, there is proposed a touch screen type electronic device that can make one-handed operation easy. In one method, an email application screen is displayed in the upper half of the touch screen and a software keyboard screen is displayed in the lower half. The software keyboard is thumb-operated, and the email application is operated from a rear touch panel. For example, see Japanese Patent Application Publication No. 2012-242851.

Referring now to the figures, FIG. 1 is a diagram showing an external form of a smartphone as an example of a portable electronic device. FIG. 1A shows the front face of a smartphone 100 and FIG. 1B shows the rear face. The smartphone 100 includes a touch screen 103, a speaker 109, a camera 111, and a home button 113 on the front face of a housing 101, and a volume control button 105 and a power switch 107 on the side faces. Though not shown, the smartphone 100 also includes a microphone, a USB terminal, and an earphone jack on the side faces.

A rear touch panel 115 is provided on the rear face of the housing 101. A pressure sensor 133 (FIG. 2) is incorporated in the rear touch panel 115. The rear touch panel 115 is provided only within a range of being able to be operated by a forefinger. When the rear touch panel is operated while changing the posture of the housing 101 to display the screen sideways, the rear touch panel 115 may be provided on the entire rear face of the housing in a manner to ignore any touch on an area where a hand is touching. In FIG. 1A, multiple icons are displayed on a home screen of the touch screen 103.

Figure 2:
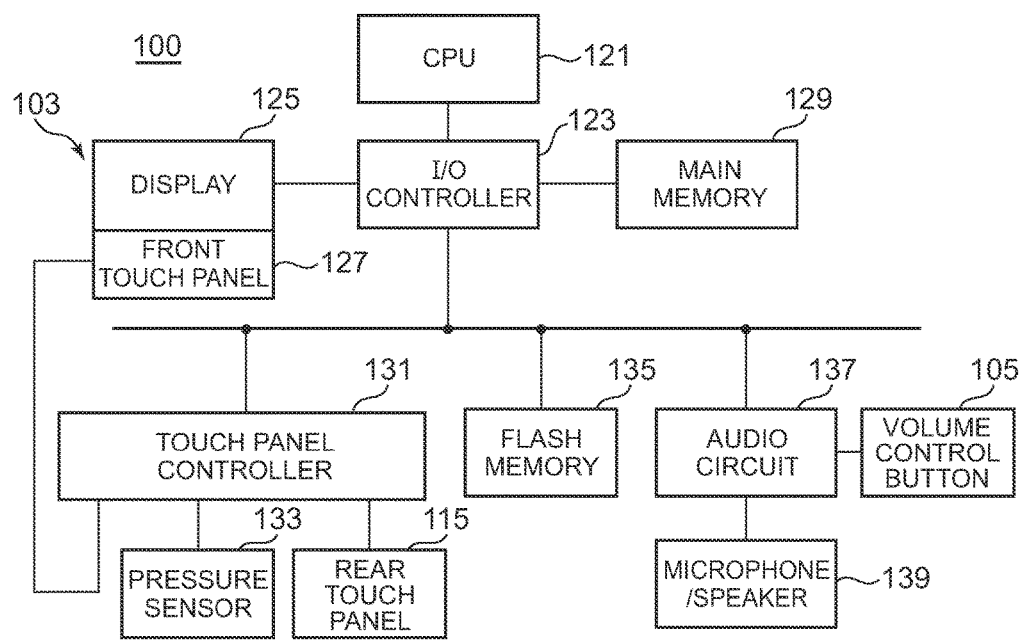
FIG. 2 is a functional block diagram showing a schematic configuration of a smartphone.

FIG. 2 is a functional block diagram showing a schematic configuration of smartphone 100. In addition to a CPU 121, display 125, and a main memory 129, multiple peripheral devices, not shown, are connected to an I/O controller 123. A display 125 is a liquid crystal display (LCD), but any other type of flat display panel such as organic EL can also be adopted. The display 125 forms the touch screen 103 together with an in-cell touch panel formed with a transparent conductive film inside. As another method of forming the touch screen 103, the touch panel may be formed with transparent electrodes as a member separately from the display 125 and placed on the display 125. In either case, the touch panel that forms the touch screen 103 will be called a front touch panel 127 below.

As the detection principle of the front touch panel 127, a projected capacitive type or surface capacitive type that outputs the coordinates of a position at which a finger has touched on or has approached the surface, a resistive film type that outputs the coordinates of a pressed position, or any other type can be employed. In this embodiment, the projected capacitive type is employed. The front touch panel 127 is connected to a touch panel controller 131.

The main memory 129 is a volatile RAM for storing programs executed by the CPU 121. The front touch panel 127, the rear touch panel 115, and the pressure sensor 133 are connected to the touch panel controller 131. Although the detection principle of the rear touch panel 115 does not need to be particularly limited, the same projected capacitive type touch panel as the front touch panel 127 can be employed as an example. The pressure sensor 133 detects pressure applied onto the rear touch panel 115 with a finger. An operation of pressing the rear touch panel 115 at a pressure of a predetermined value or more will be called a pressure operation below.

A flash memory 135 is a nonvolatile memory for storing programs, such as an OS and applications executed by the CPU 121, and data. A program for implementing an input system 300 (FIG. 5) according to the embodiment is also stored in the flash memory 135. A microphone/speaker 139 and a volume control button 105 for adjusting the volume of a speaker are connected to an audio circuit 137.

Figure 3A:
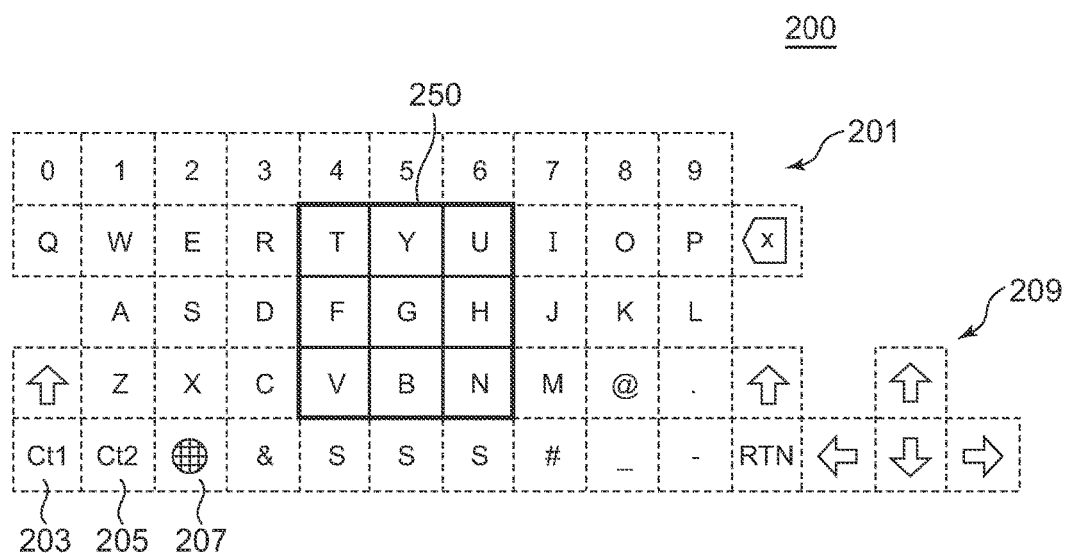
FIG. 3(A-B) is a diagram for describing an example of a reduced keyboard.

FIG. 3A is a diagram for describing an example of reduced keyboard 200 according to an embodiment. The reduced keyboard 200 is configured to include virtual keys 201 made up of multiple keys and a keyboard window 250. As an example, the virtual keys 201 are configured to include keys in a QWERTY layout, numeric keys, control keys, and the like. The virtual keys 201 has a data structure composed of data indicative of key code, a key layout, a size for displaying a predetermined number of keys in the keyboard window, and a reference key. The reference key is, for example, G key.

Figure 3B:
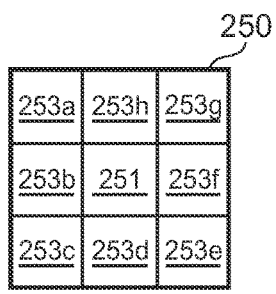

Among the virtual keys 201, only keys located in the keyboard window 250 are displayed without displaying on the display 125 all the keys at a time. As an example, the keyboard window 250 is so configured that nine keys in a 3×3 matrix can be displayed as shown in FIG. 3B. Therefore, in this example, nine keys that border on the keyboard window 250 among the virtual keys 201 are displayed. The nine keys displayed in the keyboard window 250 vary with a swipe operation performed on the rear touch panel 115 or the front touch panel 127 as will be described later.

In an example of a method of displaying keys in the keyboard window 250, the coordinates of the keyboard window 250 displayed on the display 125 are fixed, and the virtual keys are moved according to the swipe operation. In another example, the coordinates of the virtual keys are fixed with respect to the display 125, and the display position of the keyboard window 250 is shifted according to the swipe operation. In either case, only keys having the coordinates that match the coordinates of the keyboard window 250 are displayed.

The keyboard window 250 is such that one selection area 251 is defined at the center and eight auxiliary areas 253a to 253h are defined around the selection area 251. The outer frame of the keyboard window 250 and frames separating the selection area 251 and the auxiliary areas 253a to 253h from one another may be displayed opaquely or translucently on the display 125. Alternatively, it is possible not to display the frames. A key positioned in the selection area 251 will be called a selection key below.

In the reduced keyboard 200, the input of a selection key displayed in the selection area 251 can be confirmed by operating the rear touch panel 115 or the front touch panel 127. The auxiliary areas 253a to 253h serve as an auxiliary role in positioning a target selection key in the selection area 251, and may not be provided. In this case, the keyboard window 250 displays only one selection key. The virtual keys 201 include control keys 203, 205, and 207, and four cursor keys 209, which are defined, as an example, to operate the reduced keyboard 200.

Because the whole of the virtual keys 201 is not displayed at a time, the number of keys to be composed is not restricted by the size of the display 125, and the concept of the entire area of the virtual keys is not required. Further, because the relative position of the virtual keys 201 and the keyboard window 250 can be changed by swipe operation, a selection key can be positioned in the selection area 251 in a short time even when the number of keys to be composed is increased.

Therefore, the virtual keys may be such that different kinds of character keys are arranged in a planar configuration. For example, lowercase alphabet keys in the QWERTY layout may be arranged in parallel with the virtual keys 201 including uppercase alphabet keys, or kana character keys may be arranged in the order of Japanese syllabary. When a key to be displayed in the selection area 251 is operated from the rear touch panel 115, the size of the keyboard window 250 can be reduced to an extent allowed from a visual standpoint.

Figure 4A:
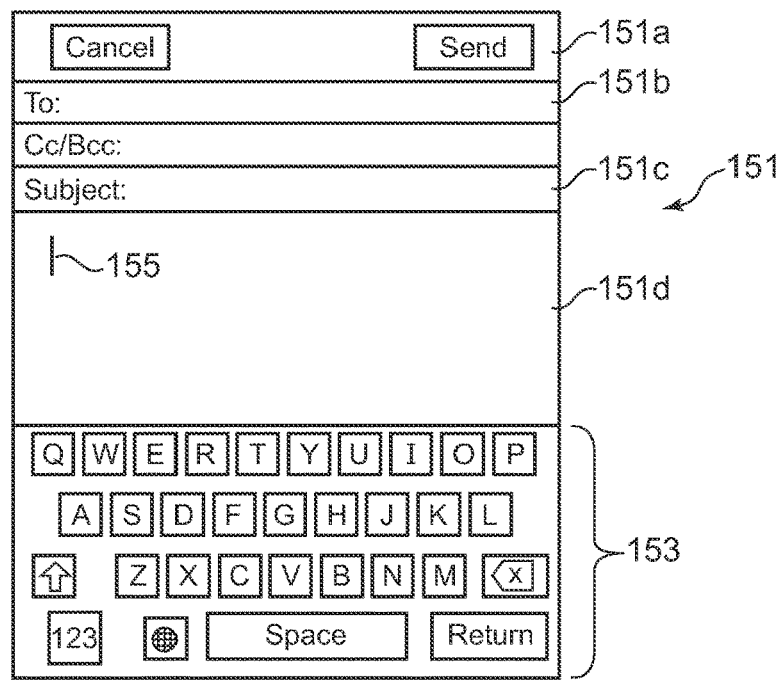
FIG. 4(A-B) is a diagram for describing a state when characters are input from a reduced keyboard in comparison with a conventional software keyboard.
Figure 4B:
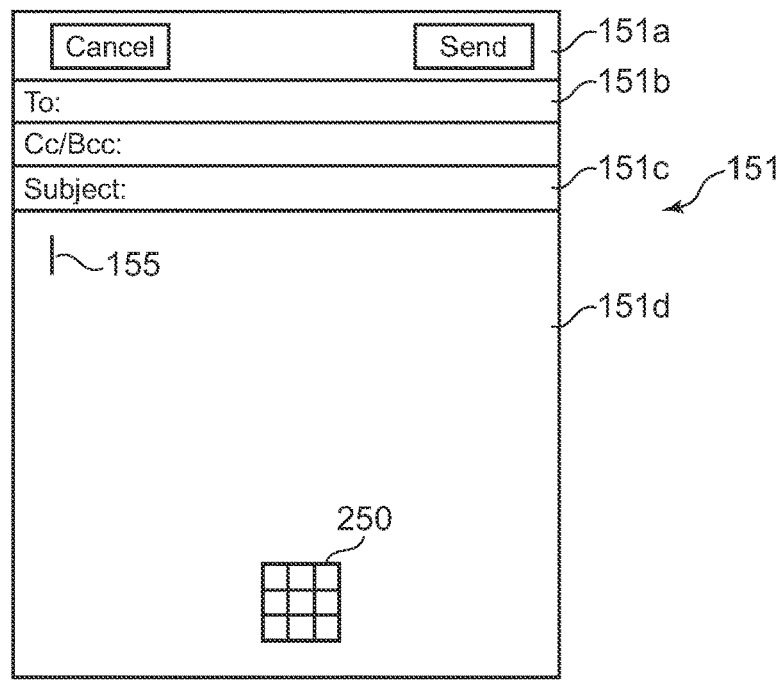

FIG. 4A shows a state when characters are input into a mailer screen 151 displayed on the display 125 from a normal software keyboard 153, and FIG. 4B shows a state when characters are input from the reduced keyboard 200. The mailer screen 151 includes a control field 151a, a destination field 151b, a title field 151c, and a text field 151d. In the text field 151d, a cursor 155 indicative of the current character input position is displayed.

Because the software keyboard 153 is operated with a finger(s) on the front touch panel 127, the minimum size of each key to be displayed is restricted to avoid selecting a wrong key. Therefore, as shown in FIG. 4A, the software keyboard 153 is displayed to occupy almost half the area of the text field 151d. On the other hand, as shown in FIG. 4B, the number of characters displayed in the keyboard window 250 is as small as nine in the reduced keyboard 200, and in the case of input from the rear touch panel 115, the size of each key to be displayed can be reduced to such an extent that causes no visibility problem.

The area of the text field 151d hidden behind the keyboard window 250 is small in the reduced keyboard 200, and this makes it convenient to operate and browse an application screen. In order to enlarge the display area of the text field 151d, it is considered a method of making keys of the software keyboard 153 translucent. In this case, when operating from the front touch panel 127, the user has the potential to mistake an operation to a background image for an operation to the software keyboard 153. Even when the keys are made translucent, the user remains unable to operate the hidden application screen.

On the other hand, when operating the reduced keyboard 200 from the rear touch panel 115, even if the frame of the keyboard window 250 and the virtual keys displayed therein are made translucent, the user will not mistake the input of a key for an operation to the application screen. In this case, the application screen displayed by being overlapped with the keyboard window 250 can be operated from the front touch panel 127. Further, when an operation from the rear touch panel 115 is performed, all the keys of the virtual keys 201 can be made translucent and displayed by being overlapped with the text field 151d.

Input System

Figure 5:
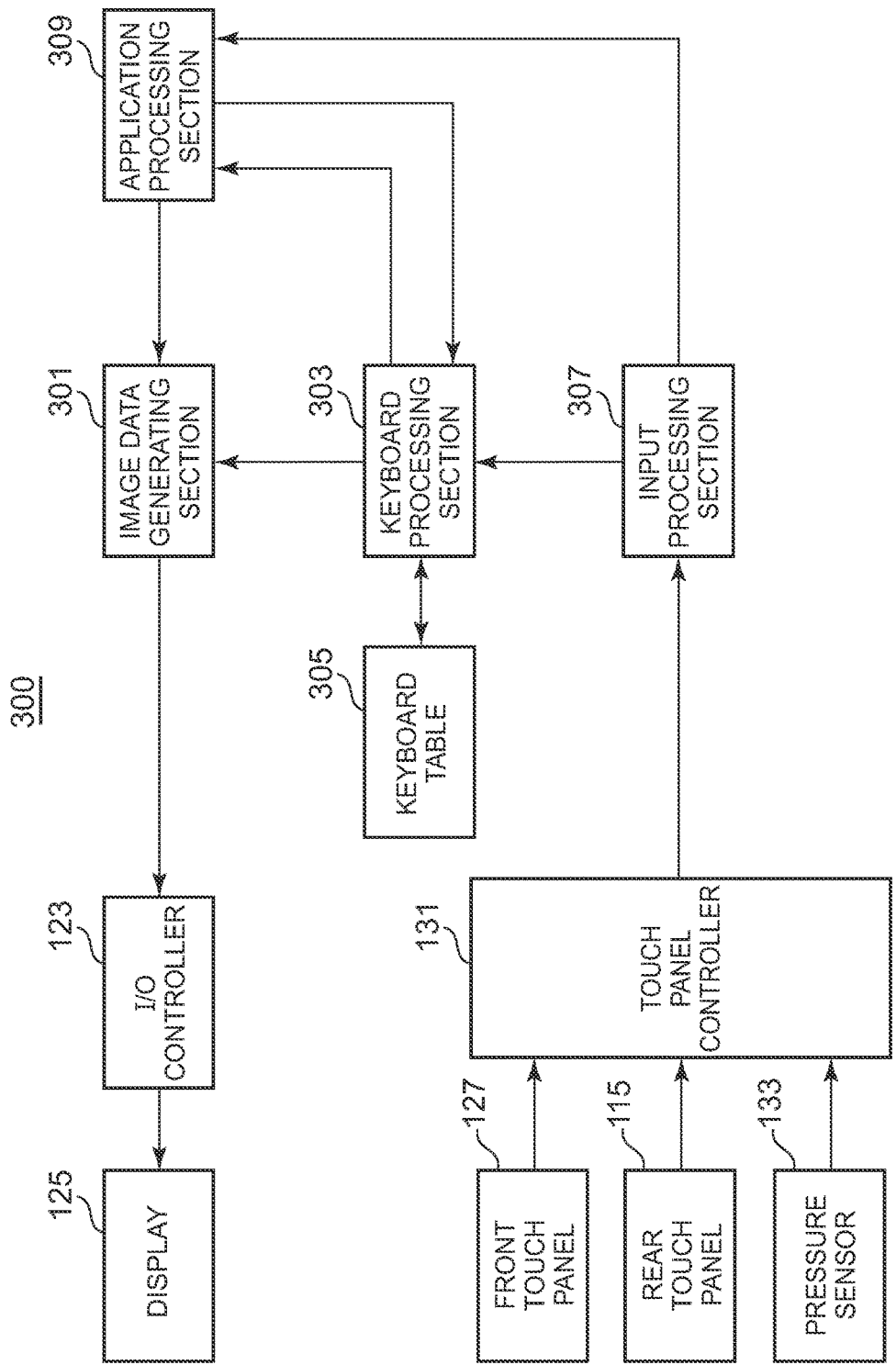
FIG. 5 is a functional block diagram showing the configuration of an input system that supports a reduced keyboard.

FIG. 5 is a functional block diagram showing the configuration of the input system 300 that supports the reduced keyboard 200. The input system 300 is made up of the hardware resources shown in FIG. 1 and software resources stored in the flash memory 135. An image data generating section 301, a keyboard processing section 303, a keyboard table 305, an input processing section 307, and an application processing section 309 are implemented by an application program, an OS, a device driver, and software resources, such as a program for controlling operations to the reduced keyboard 200, in cooperation with the hardware resources, such as the CPU 121 that executes the software resources and the main memory 129.

The touch panel controller 131 converts the coordinates, corresponding to a touch operation of the front touch panel 127 or the rear touch panel 115 with a finger, into a predetermined protocol, and sends it to the input processing section 307. When a pressure operation is performed on the rear touch panel 115, the touch panel controller 131 sends pressure data to the input processing section 307. The input processing section 307 sends the keyboard processing section 303 and the application processing section 309 the coordinate data received from the touch panel controller 131 and the pressure data together with touch panel identification information indicating which of the front touch panel 127 and the rear touch panel 115 is the source.

The input processing section 307 supports multi-touch operation to enable processing of the coordinates of two or more fingers touching the front touch panel 127 or the rear touch panel 115 at the same time. The application processing section 209 sends the image data generating section 201 data for displaying an image along with the execution of the application program, and recognizes the image being currently displayed on the display 125. The application processing section 309 identifies the operation contents from the coordinate data or the pressure data received from the input processing section 307 to execute the application program.

When recognizing, from the coordinate data or the pressure data received from the input processing section 307, that an instruction for changing to the input mode is given, the application processing section 309 makes a transition of the keyboard processing section 303 to the input mode. When receiving an instruction for changing the input mode through the front touch panel 127, the application processing section 309 can instruct the keyboard processing section 303 to display the software keyboard 153 on the display 125.

When receiving an instruction for changing the input mode through the rear touch panel 115, the application processing section 309 can instruct the keyboard processing section 303 to display the keyboard window 157 on the display 125. As an example, the application processing section 309 displays the mailer screen 151 and receives key code input from the software keyboard 153 or the reduced keyboard 200.

The keyboard table 305 holds a data structure of multiple virtual keys composed of various characters including the virtual keys 201 and the key layout shown in FIG. 3A. When receiving an instruction for changing to the input mode form the application processing section 309, the keyboard processing section 303 displays the software keyboard 153 or the keyboard window 250 on the display 125.

When the keyboard window 250 is displayed on the display 125, the keyboard processing section 303 generates image data of a key to be displayed in the keyboard window 250 based on the coordinates of a reference key in the virtual keys 201 and the coordinates of the keyboard window 250, and sends the image data to the image data generating section 301. When the keyboard window 250 is displayed, the keyboard processing section 303 changes the coordinates of the reference key according to the swipe operation to the front touch panel 127 or the rear touch panel 115.

The keyboard processing section 303 generates image data of a key to be displayed in the keyboard window 250 each time the coordinates of the reference key is changed, and sends the image data to the image data generating section 301. The keyboard processing section 303 sends the application processing section 309 key code of a key displayed in the selection area 251 when receiving the coordinate data for confirming the input or the pressure data from the input processing section 307. The image data generating section 301 generates pixel data to be displayed on the display 125 and sends it to the I/O controller 123.

Operation of Input System

Figure 6:
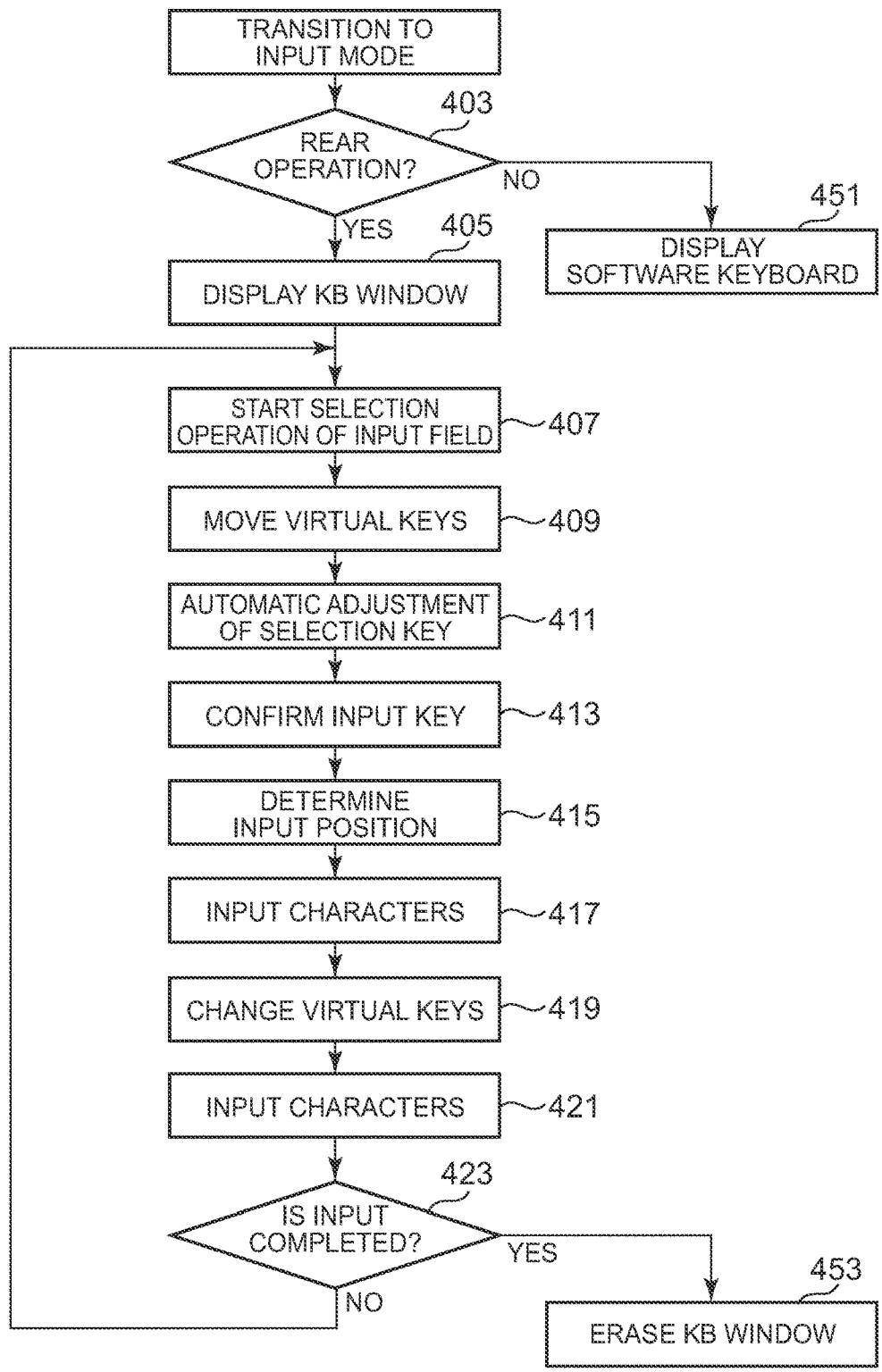
FIG. 6 is a flowchart showing a procedure when an input system inputs characters to a mailer screen.
Figure 7:
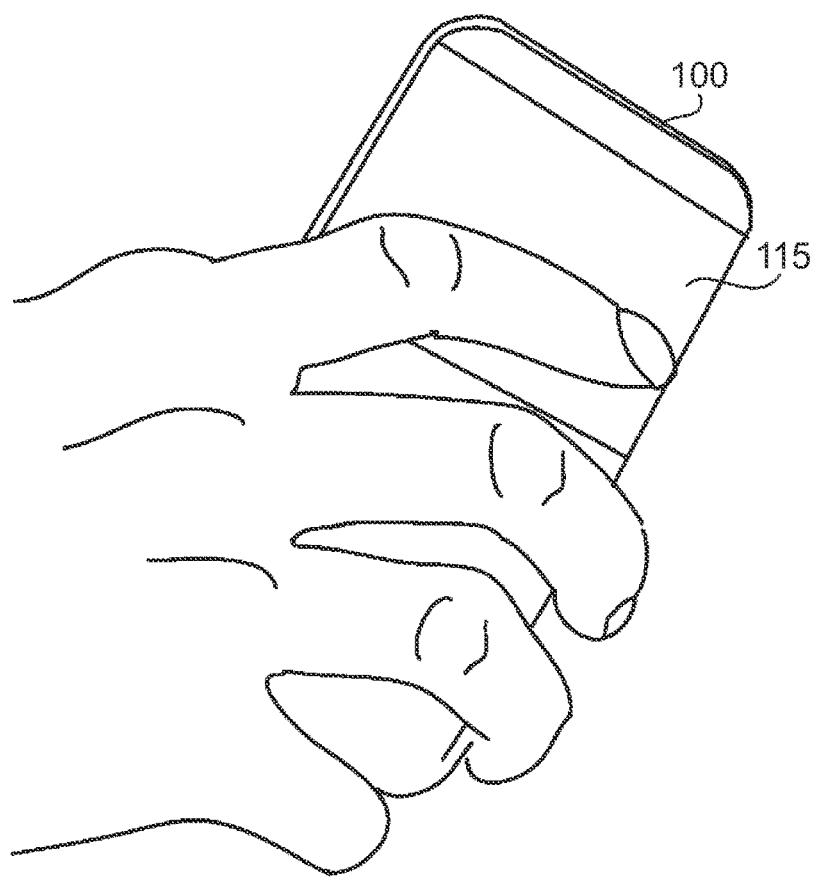
FIG. 7 is a diagram for describing a state of one-handed operation of a smartphone.

FIG. 6 is a flowchart showing a procedure when input system 300 inputs and transmits characters to mailer screen 151. Here, the procedure will be described by exemplifying a case where "Hello, おはよう" is entered in the text field 151*d* of the mailer screen 151. As shown in FIG. 7, the user holds the smartphone 100 in his/her right hand, and further operates the rear touch panel 115 with his/her right hand's forefinger while holding the smartphone 100. Holding the housing and performing an input operation to the reduced keyboard 200 with a finger of the same hand is called one-handed operation.

In block 401, when the application processing section 309 is executing a mailer and displaying on the display 125 a mail reception screen, an operation for displaying the mailer screen 151 to create an outgoing mail through the front touch panel 127 or the rear touch panel 115 is performed. The operation from the front touch panel 127 can be a touch operation to a symbol corresponding to the input mode and contained in the mail reception screen. The operation from the rear touch panel 115 can be a touch operation or a pressure operation at an unspecified location for a given time or more.

The application processing section 309 instructs the image data generating section 301 to display the mailer screen 151 on the display 125. Further, the application processing section 309 sends the touch panel identification information to the keyboard processing section 303 to instruct the keyboard processing section 303 to make a transition to the input mode. When determining in block 403 that the instruction for making a transition to the input mode is given through the front touch panel 127, the keyboard processing section 303 moves to block 451 to instruct the image data generating section 301 to display the software keyboard 153 in a manner to overlap with the mailer screen 151 as shown in FIG. 4A. Because the input procedure from the software keyboard 153 is a conventional method, the description thereof will be omitted.

When determining that the instruction for making a transition to the input mode is given through the rear touch panel 115, the keyboard processing section 303 moves to block 405 to instruct the image data generating section 301 to display the keyboard window 250 at predetermined coordinates as shown in FIG. 4B. Note that the keyboard processing section 303 can change the display between the software keyboard 153 and the keyboard window 250 by a predetermined operation from the rear touch panel 115.

It is assumed that the cursor 155 is positioned by default in the destination field 151*b* when the keyboard window 250 is displayed. The keyboard processing section 303 acquires the data structure of the virtual keys 201, for example, from the keyboard table 305 by default. At this time, the keyboard processing section 303 generates image data to be displayed in the keyboard window 250 to display a reference key in the selection area 251. As a result, nine keys of the virtual keys 201 are displayed in the keyboard window 250 as shown in FIG. 3A, and G key is displayed in the selection area 251.

In block 407, an operation for inputting a control key 203 is started to confirm the input field. Because the G key displayed by default in the selection area 251 is not the intended key, the user swipes his/her forefinger on the rear touch panel 115 to change the key to be displayed in the keyboard window 250 in block 409. The keyboard processing section 303 changes the coordinates of the reference key each time coordinate data on the swiped finger is received, and indicates an image to be displayed in the keyboard window 250 to the image data generating section 301. The key to be displayed in the keyboard window 250 varies in the horizontal direction, the vertical direction, or an oblique direction according to the direction of the swiped finger.

Figure 8:
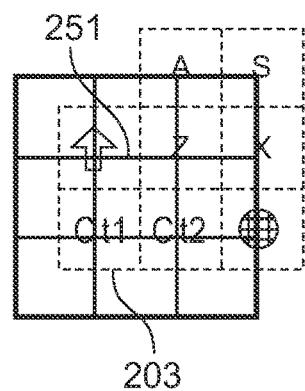
FIG. 8 is a diagram for describing a state of automatically adjusting a selection key.

Further, the moving speed of the key to be displayed in the keyboard window 250 varies according to the speed of the swiped finger. For example, when the swipe operation is performed initially at a high speed, a part of the control key 203 eventually appears in the auxiliary areas 253*b* to 253*c*. Then, as shown in FIG. 8, when the control key 203 comes close to the selection area 251, the user slows down the speed of his/her finger to swipe in order to position the control key 203 exactly in the selection area 251, thus making a fine adjustment of the display position.

In block 411, when the selection area 251 contains two or more of the multiple virtual keys because the exact positioning is not completed after the relative speed between the keyboard window 250 and the virtual keys 201 becomes less than or equal to a predetermined value, or becomes zero, the keyboard processing section 303 forcibly positions a key that occupies the largest area in the selection area 251. This processing performed by the keyboard processing section 303 will be called the automatic adjustment of the selection key below.

At this time, the keyboard processing section 303 may enlarge the display of the automatically adjusted selection key in a pop-up on the display 125 so that the user can recognize the selection key for sure. After completion of the automatic adjustment of the selection key, when the user performs in block 413 a touch operation or a pressure operation in any position of the rear touch panel 115 for a predetermined time or more, the input of the control key 203 displayed in the selection area 251 is confirmed.

The keyboard processing section 303 sends the application processing section 309 key code of the key (the control key 203 in this case) displayed in the selection area 251 when the input confirming operation is performed. The application processing section 309 changes the position of the cursor 155 from the destination field to the text field 151*d* in predetermined order each time the input of the control key 203 is confirmed, and indicates the display position of the cursor 155 to the image data generating section 301 every time.

As shown in FIG. 4B, the cursor 155 is positioned in the starting position of the text field 151*d* to finish specifying the input field. In block 415, the user repeats the procedure from block 409 to block 413 to confirm the input of any one of the four cursor keys 209. The application processing section 309 instructs the image data generating section 301 to move the cursor 155 in a vertical or horizontal direction line by line or row by row each time key code of the cursor key 209 is received. When the cursor 155 is moved to an input intended position, the input position is confirmed.

In block 417, when the procedure from block 409 to block 413 is repeated to input keys of a word "Hello," in order, the application processing section 309 displays a character in the text field 151*d* every time. At this time, the keyboard processing section 303 can predict an intended word from among words entered in the past or words set by default each time a character that forms part of the word is entered to display multiple character candidates opaquely or translucently on the display 125.

When the character candidates are displayed, the keyboard processing section 303 can make a transition to a selection mode to select a character candidate by two-finger tapping, for example, of the forefinger and middle finger at the same time. In the selection mode, the input can be confirmed with a touch operation or a pressure operation to the rear touch panel 115 for a predetermined time or more after a character candidate is selected by a swipe operation to the rear touch panel 115.

Subsequently, although the input of kana characters "おはよう" is required, the virtual keys 201 do not include the kana characters. In block 419, the user taps the rear touch panel 115 with one finger or inputs the control key 207 to change the active virtual keys. When receiving the input of changing the virtual keys, the keyboard processing section 303 acquires the virtual keys of kana characters arranged in the order of Japanese syllabary from the keyboard table 305, and sends image data to be displayed in the keyboard window 250 to the image data generating section 301. In block 421, the procedure from block 409 to block 413 is repeated to complete the input of kana characters "おはよう." When the input of all the characters is completed in block 423, the key 205 is input in block 453, for example, through the rear touch panel 115 to leave the input mode.

After completion of the input mode, the keyboard processing section 303 instructs the image data generating section 301 to terminate the display of the keyboard window 250. When input is performed in any other field, the procedure returns to block 407. When input to all the fields is completed, the email can be transmitted with a touch operation of the control field 151a through the front touch panel 127. It is desired to perform an operation using the rear touch panel 115 as the operation of the reduced keyboard 200 in terms of the reduction in the keyboard window, the prevention of wrong selection, and the operation and browsing of the application screen, but input may also be performed by a swipe operation or tap operation through the front touch panel 127.

The relationship between the touch operation and the pressure operation to the rear touch panel 115 mentioned above is just an example, the operations to the rear touch panel can be defined in various ways. Further, the example of using the control keys 203 to 207 and the pressure sensor 133 to operate the reduced keyboard 200 has been described, the keyboard processing section 303 can also use gesture inputs defined in various ways for multi-touch operation to perform operations only through the rear touch panel 115.

Another Example of Reduced Keyboard

Figure 9A:
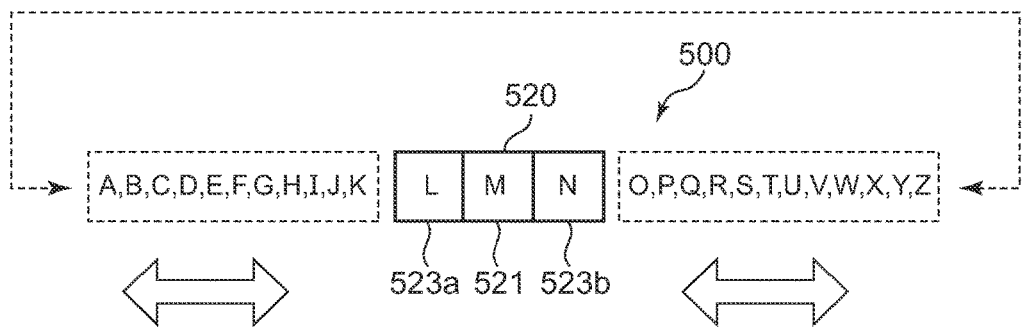
FIG. 9(A-B) is a diagram for describing the configuration of a reduced keyboard.
Figure 9B:
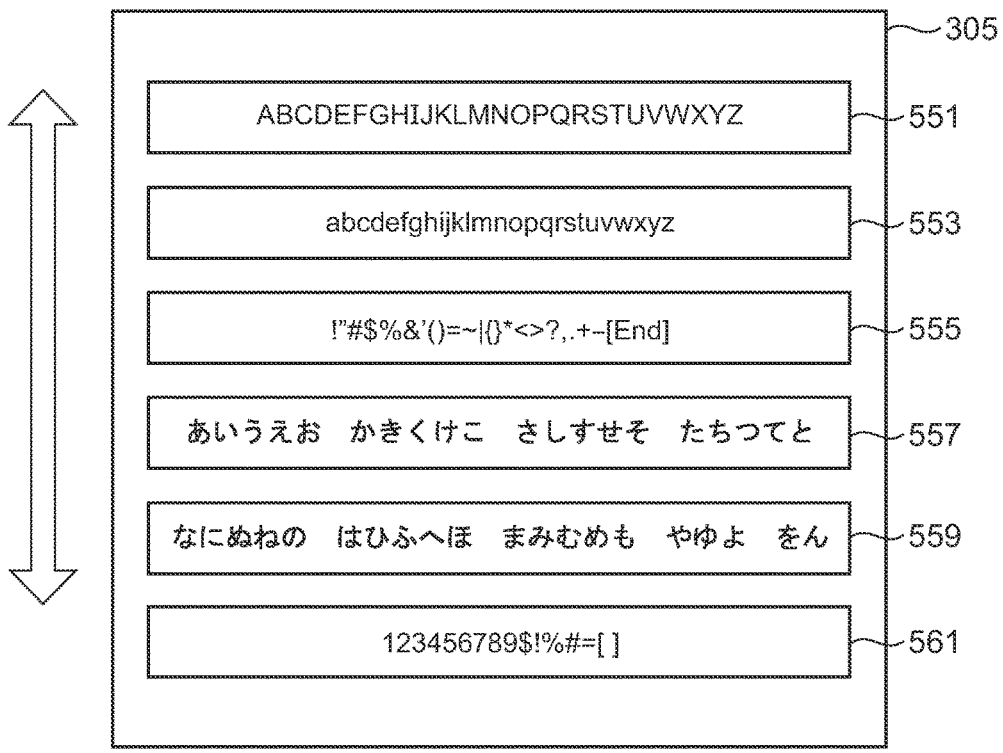

FIG. 9 is a diagram for describing the configuration of reduced keyboard 500 as another example. The reduced keyboard 500 is made up of multiple virtual keys 551 to 561 in a one-dimensional array shown in FIG. 9B, respectively, and a keyboard window 520 in a one-dimensional 1×3 array shown in FIG. 9A. The keyboard window 520 is disposed in the horizontal direction of the display 125.

The keyboard window 520 includes one selection area 521 and two auxiliary areas 523a, 523b arranged on both sides of the selection area 521. Virtual keys 551 are composed of uppercase alphabet keys arranged in alphabetical order, and virtual keys 553 are composed of lowercase alphabet keys arranged in alphabetical order. Virtual keys 555 are composed of symbol keys and control keys. Virtual keys 557 and 559 are composed of kana keys arranged in the order of Japanese syllabary, and virtual keys 561 are composed of numeric keys and symbol keys arranged in order.

Any virtual keys are selected and displayed in the keyboard window 520. The rear touch panel 115 can be swiped with respect to the selected virtual keys to move keys to be displayed in the keyboard window 520 cyclically to the right or left. The virtual keys can also be slid cyclically up or down and selected by swiping the rear touch panel 115. The selection of keys to be displayed in the keyboard window 520 or the selection of virtual keys can be made by using the volume control button 105 instead of the operation of the rear touch panel 115.

The keyboard window 520 may also be arranged in a 2×3 matrix to display the virtual keys 551 and 553 in two columns at the same time. Further, the keyboard window 520 may be arrayed in the vertical direction of the display 125. Although both of the reduced keyboards 200 and 500 have been described by taking, as an example, a case where the virtual keys are moved while fixing the display position of the keyboard window, the display position of the keyboard window may be moved while fixing the virtual keys.

When the virtual keys are QWERTY keys, the user can select and enter a key while moving the keyboard window as if the user performs input on the imaged software keyboard 153 because of being familiar with the position of each key. At this time, virtual keys other than the keys positioned in the keyboard window are not displayed on the display 125 or the whole can be displayed translucently. The reduced keyboard 200, 500 is effectively applied to a portable electronic device equipped with a small touch screen, such as a tablet terminal or a smartphone.

In the above explanation, embodiments are described with particular characteristics shown in drawings. However, the disclosure is not limited to these embodiments shown in the drawings, and as far as the advantageous effects described can be achieved, other embodiments can adopt any configuration that has been known until now. If not otherwise stated herein, it is to be assumed that all patents, patent applications, patent publications and other publications (including web-based publications) mentioned and cited herein are hereby fully incorporated by reference herein as if set forth in their entirety herein.

Embodiments have been described with reference to specific examples illustrated in the drawings. However, these are simply non-limiting examples, and of course, so long as the effects are obtained, any kind of well known configuration can be employed.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising: displaying, on a touch sensitive display disposed on a front face of a device housing, a subset of a plurality of virtual keys, wherein the subset is displayed in a keyboard window on the touch sensitive display, the keyboard window comprising a selection area displaying a key of the subset of the plurality of virtual keys, wherein the key comprises a key having coordinates falling within the coordinates of the selection area of the keyboard window; receiving user input positioning the subset of the plurality of virtual keys within the keyboard window to position a key of the subset of the plurality of virtual keys within the selection area; receiving, at a touch panel disposed on a rear face of the device housing, user input selecting the key displayed in the selection area; providing, based on the key selected, key input to an application; and changing, based on receipt of further user input positioning the subset of the plurality of virtual keys within the keyboard window, the key displayed in the selection area to a second subset of the plurality of virtual keys, wherein the second subset of the plurality of virtual keys displayed comprises a new key having coordinates falling within the coordinates of the selection area.

2. The method of claim 1, wherein a speed of displaying the plurality of keys in the keyboard window adjusts each key displayed at a speed based upon the user input to the touch panel.

3. The method of claim 1, wherein the keyboard window includes auxiliary areas for displaying keys adjacent to the selection area.

4. The method of claim 3, wherein a key that occupies the largest area in the selection area is forcibly positioned into the selection area.

5. The method of claim 1, wherein the keyboard window displays a plurality of keys displayed in a manner selected from a group consisting of: a one-dimensional arrangement, a two dimensional arrangement, and a 3×3 matrix.

6. The method of claim 1, wherein user input changes the display between a full software keyboard and the keyboard window.

7. An apparatus, comprising: a housing; a touch sensitive display disposed on a front face of the housing; a touch panel disposed on a rear face of the housing; an input device; a processor operatively coupled to the input device and the display; and a memory storing instructions that are executable by the processor to: display, on the touch sensitive display, a subset of a plurality of virtual keys, wherein the subset is displayed in a keyboard window on the touch sensitive display, the keyboard window comprising a selection area displaying a key of the subset of the plurality of virtual keys, wherein the key comprises a key having coordinates falling within the coordinates of the selection area of the keyboard window; receive user input positioning the subset of the plurality of virtual keys within the keyboard window to position a key of the subset of the plurality of virtual keys within the selection area; receive, at the touch panel, user input selecting the key displayed in the selection area; provide, based on the key selected, key input to an application; and change, based on receipt of further user input positioning the subset of the plurality of virtual keys within the keyboard window, the key displayed in the selection area to a second subset of the plurality of virtual keys, wherein the second subset of the plurality of virtual keys displayed comprises a new key having coordinates falling within the coordinates of the selection.

8. The apparatus of claim 7,
wherein a speed of displaying the plurality of keys in the keyboard window adjusts each key displayed at a speed based upon the user input to the touch panel.

9. The apparatus of claim 7, wherein the keyboard window includes auxiliary areas for displaying keys adjacent to the selection area.

10. The apparatus of claim 9, wherein a key that occupies the largest area in the selection area is forcibly positioned into the selection area.

11. The apparatus of claim 7, wherein the keyboard window displays a plurality of keys displayed in a manner selected from a group consisting of: a one-dimensional arrangement, a two dimensional arrangement, and a 3×3 matrix.

12. The apparatus of claim 7, wherein the user input changes the display between a full software keyboard and the keyboard window.

13. A product, comprising: a non-signal computer readable storage device storing code therewith, the code being executable by a processor and comprising: code that displays, on a touch sensitive display disposed on a front face of a device housing, a subset of a plurality of virtual keys, wherein the subset is displayed in a keyboard window on the touch sensitive display, the keyboard window comprising a selection area displaying a key of the subset of the plurality of virtual keys, wherein the key comprises a key having coordinates falling within the coordinates of the selection area of the keyboard window; code that receives user input positioning the subset of the plurality of virtual keys within the keyboard window to position a key of the subset of the plurality of virtual keys within the selection area; code that receives, at a touch panel disposed on a rear face of the device housing, user input selecting the key displayed in the selection area; code that provides, based on the key selected, key input to an application; and code that changes, based on receipt of further user input positioning the subset of the plurality of virtual keys within the keyboard window, the key displayed in the selection area to a second subset of the plurality of virtual keys, wherein the second subset of the plurality of virtual keys displayed comprises a new key having coordinates falling within the coordinates of the selection area.

* * * * *